Nov. 6, 1934.  C. C. JONES  1,980,140
BOUNDARY LAYER CONTROL FOR AIRFOILS
Filed Nov. 7, 1932  2 Sheets-Sheet 2
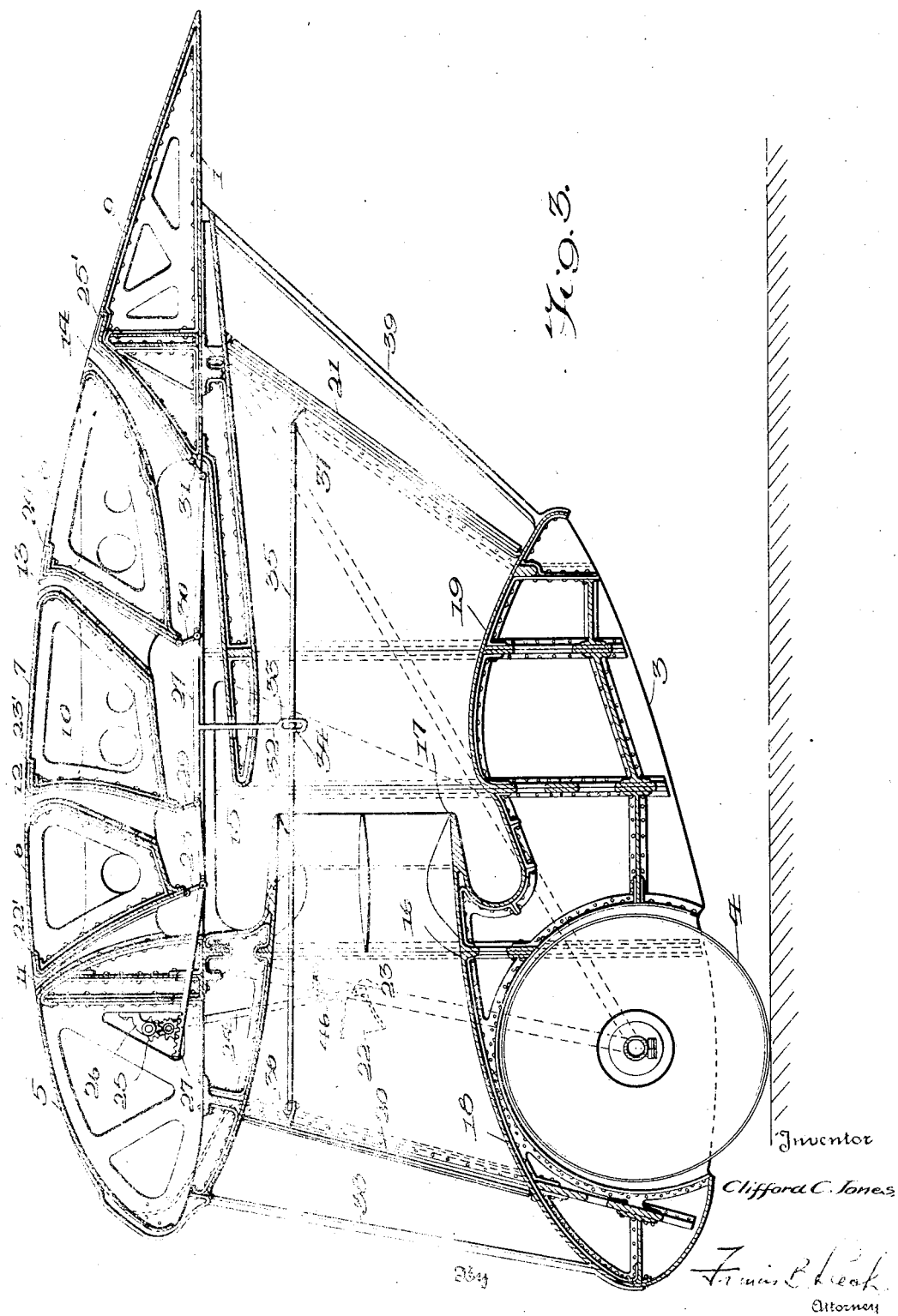
Inventor
Clifford C. Jones
Attorney Patented Nov. 6, 1934

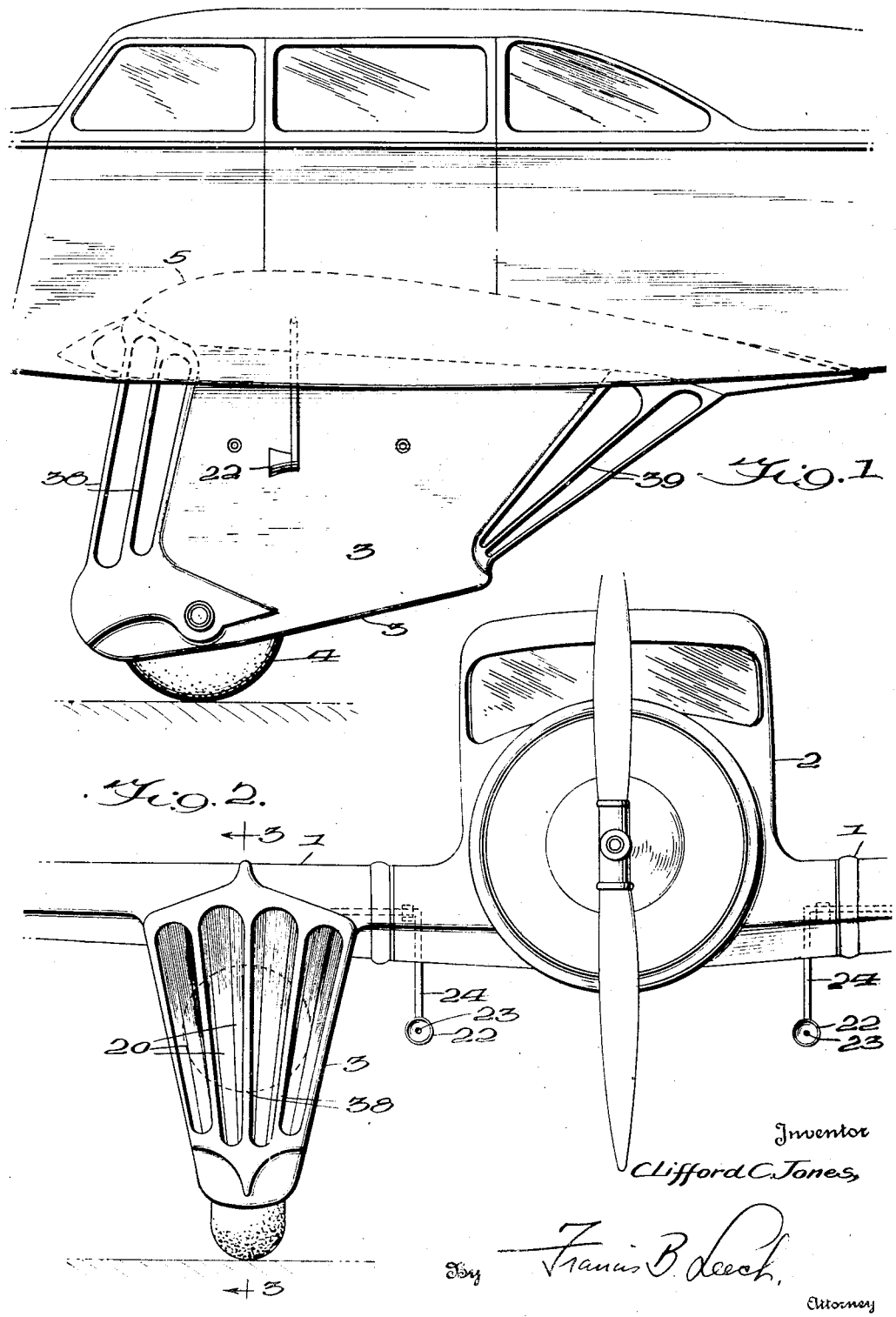

1,980,140

UNITED STATES PATENT OFFICE 1,980,140

BOUNDARY LAYER CONTROL FOR AIRFOILS

Clifford C. Jones, Washington, D. C.

Application November 7, 1932, Serial No. 641,680

6 Claims. (Cl. 244—12)

The principal object of this invention is the removal of the so called "boundary layer" of air from the upper surface of an airfoil.

As is well known by those skilled in the art and as pointed out in my prior Patent No. 1,764,842, dated June 17, 1930, and in my copending application, Ser. No. 639,715, filed October 26, 1932, all airfoils, when in flight, accumulate on their upper surfaces a stratum of dead or "non-lift" air, commonly known as "boundary layer."

This accumulation of stagnant air decreases the aerodynamic efficiency of the airfoil and substantially lowers its lift capacity necessitating high take-off and landing speeds with airplanes using conventional airfoils.

The problem confronting the aeronautical designer is one of great perplexity as airfoils limited in size must be utilized, and yet, such foils must have high inherent efficiency and lift-drag characteristics.

Furthermore, it is known that the higher the flight speed of the plane, the greater the boundary layer adhering to the surfaces of the wings for the air through which it is passing does not follow the contour of the airfoil but tends to veer off. The increased frictional effects of the boundary layer decrease the kinetic energy resulting in lift loss.

To insure the removal of the deleterious boundary layer, it is proposed in my above-noted patent to suck the layer from the upper surfaces of the airfoil, while in the application referred to, a mechanism for accomplishing this is disclosed, wherein a true induction type venturi located in the undercarriages communicates with the wing section where the boundary layer occurs.

This application is primarily directed to an automatic control system for the invention claimed in application, Serial No. 639,715, filed October 26, 1932.

In the drawings, Fig. 1 is a partial side elevation of an airplane embodying the invention.

Fig. 2 is a partial front elevation of the plane illustrating one leg of the undercarriage and the pressure responsive vanes, while Fig. 3 is a vertical sectional view taken on line 3—3 of Fig. 2.

More specifically in the drawings, numeral 1 denotes the airfoil or wing of the airplane attached to fuselage 2 supported, when on the ground, by legs 3—3 of the undercarriage terminating in airwheel 4.

By referring to Fig. 3, it will be seen that the airfoil 1 is composed of a plurality of spar members 5, 6, 7, 8 and 9 strengthened by ribs 10, one of which is shown. Each rib 10 of the series used in the airfoils has metal spars 5, 6, 7, 8 and 9 longitudinally supported thereon, these spars being fastened around the sections so that slots or openings 11, 12, 13 and 14 are formed therebetween, the slots enlarging as they pass downward through the wing and open into a common header or conduit 15 running longitudinally throughout the wing and terminating in a venturi adjacent the fuselage 2 and interiorly of the undercarriage 3.

The structure of the venturi and undercarriage is described in detail and claimed in my copending application, Serial No. 639,715, filed October 26, 1932.

As before stated and for the purposes of this invention, it is sufficient to state that the salient features herein claimed are for improved control means for regulating the air inlet, suction venturi and airfoil slots described in application, Serial No. 639,715, filed October 26, 1932.

In the legs of the undercarriage 3 an induction type venturi 16 is built with a flared air inlet 18, restricted nozzle 17 and enlarged discharge outlet 19. The header or conduit 15 above referred to, terminates in a convolution surrounding the venturi nozzle 18. When the airplane is in forward flight, the air pressure developed in the venturi 16 draws large quantities of air downwardly through slots 11, 12, 13 and 14 into header 15 and exhausts the air through exhaust 19. The slots or openings in the airfoil are positioned in the central pressure area where the boundary layer of dead or non-lift air builds up and consequently removes this boundary layer as soon as it is created.

It is a well established aerodynamic principle that the boundary layer is proportionate to the speed of flight. This being so, it is necessary to remove more of the layer as the speed of the plane increases. To simply and efficiently accomplish this, vertical shutters 20 and 21 are positioned at the inlet and outlet of each venturi while the airfoil slots or openings 11, 12, 13 and 14 are each provided with oscillating valves 22, 23, 24 and 25, respectively, which normally close the slots and make a continuous outer skin surface.

The vertical shutters 20 and 21 of the venturi are normally closed when the ship is at rest.

Pivoted to the underside of the airfoil, intermediate each undercarriage leg 3 and fuselage, is a pressure vane or speed responsive device 22 in the form of an open-flared cup having a small compensating opening 23 therein. The cup is hung on an arm 24 terminating in a gear segment 25 pivoted to a bracket attached to rib 10 on spar section 5. The gear 25 is in mesh with gear 26 riding on rack bar 27 which in turn is pivotally attached to the lower portions of oscillatable slot valves 22', 23', 24' and 25' by arms 28, 29, 30 and 31, respectively. Depending from rack bar 27 is an arm 32 terminating in elongated opening 33 in which transverse pin 34 in rod 35 rides. This rod 35 is pivotally attached to bell cranks 36 and 37 affixed to Venturi shutters 20 and 21 for opening and closing the same.

Thus it will be seen that when the pressure device 22 is pivoted rearwardly by the air pressure, it moves the rack bar 27 forward through the gears 25 and 26. The farther the cup is pivoted, the more movement is given the rack bar. Through the linkage mechanism of arms 28, 29, 30, 31, 32 and 35 and cranks 36 and 37, the valves 22, 23, 24 and 25 and shutters 20 and 21 are opened as shown in Fig. 3. Conversely, as the speed of the plane decreases, the vane or cup 22 moves forward and carries the rack bar backward and proportionately closes the vanes and shutters so that less boundary air is drawn in the airfoil slots and exhausted through the venturi above described.

It is preferable, although not essential, to protect the Venturi shutters by encasing them with an ornamental grille or metal openwork 38 and 39, carried up from the lower portion of the undercarriage to the airfoil and this grille also acts as an additional bracing.

A compression spring 46 may also be fixed to the wing and pivoted arm 24 to relieve excess strain and fluctuations when the speed or pressure cup 22 is actuated.

It should be borne in mind that the disclosures in the annexed specification and drawings are merely illustrative of one practical means of regulating and controlling the elimination of boundary layer from airfoils and that this principle may be accomplished by equivalent apparatus.

What I claim is:

1. In an airplane, an airfoil, valves positioned in the upper surfaces thereof, exhaust means connected to said valves and a speed responsive device adapted to control said valves and said exhaust means.

2. In an airplane, an airfoil, the airfoil having slots in the upper surfaces thereof, control valves therefor, a venturi in the integral portion of the undercarriage of the airplane, a conduit leading from the said slots to the said venturi and a pressure operated device controlling the inlet and exhaust of said venturi and said valves, and means controlling the pressure drop and air density in said venturi.

3. In an airfoil, a plurality of longitudinal hollow metal spars, the upper portions of the spar members being provided with slots formed therebetween communicating with a longitudinal passage adjacent the lowest portion of the spars, oscillatable valves normally closing the said slots and a linkage mechanism for opening said valves simultaneously.

4. In an airplane, an airfoil therefor, the airfoil being provided with slots in the upper surfaces thereof, an undercarriage for said airplane, an induction type venturi carried by said undercarriage and in communication with said slots, shutters for the inlet and exhaust of the venturi adapted to be opened by the pressure actuated means of the fluid medium through which the airplane is passing.

5. In an airplane, an airfoil therefor, the airfoil being provided with slots in the upper surfaces thereof, an undercarriage for said airplane, an induction type venturi carried by said undercarriage and in communication with said slots, vertical shutters normally closing the inlet and exhaust ports of the venturi and a pressure responsive vane carried on the forward portion of the airfoil and linked to said Venturi shutters to open and close the same.

6. In an airplane, an airfoil therefor, the airfoil being provided with slots in the upper surfaces thereof, an undercarriage for said airplane, an induction type venturi carried by said undercarriage and in communication with said slots, valves normally closing the said slots and Venturi inlet, a speed responsive vane actuated by air pressure and connected to said slot and Venturi valves to synchronously open the same.

CLIFFORD C. JONES.